United States Patent
Tingler et al.

(10) Patent No.: US 8,076,809 B2
(45) Date of Patent: Dec. 13, 2011

(54) ADDITIVES FOR IMPROVING MOTOR OIL PROPERTIES

(75) Inventors: Kevin S. Tingler, Bartlesville, OK (US); Ketankumar K. Sheth, Tulsa, OK (US); Suresha R. O'Bryan, Joplin, MO (US); Jianzhong Yang, Missouri City, TX (US); Tauseef Salma, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/693,569

(22) Filed: Jan. 26, 2010

(65) Prior Publication Data

US 2010/0187925 A1    Jul. 29, 2010

Related U.S. Application Data

(60) Provisional application No. 61/147,378, filed on Jan. 26, 2009.

(51) Int. Cl.
| | |
|---|---|
| *H02K 5/10* | (2006.01) |
| *F16C 33/12* | (2006.01) |
| *C10M 169/04* | (2006.01) |
| *F16J 15/20* | (2006.01) |

(52) U.S. Cl. ........... 310/87; 508/103; 508/113; 508/124
(58) Field of Classification Search .................... 310/87; 508/124, 165, 103, 113, 128; 516/33; 438/777
See application file for complete search history.

(56) References Cited

U.S. PATENT DOCUMENTS

| | | | | |
|---|---|---|---|---|
| 4,453,099 | A * | 6/1984 | Flat .................................. | 310/87 |
| 5,898,245 | A | 4/1999 | Cochimin | |
| 7,419,941 | B2 | 9/2008 | Waynick | |
| 2005/0124504 | A1* | 6/2005 | Zhang et al. ................... | 508/128 |
| 2005/0269548 | A1 | 12/2005 | Jeffcoate et al. | |
| 2006/0084278 | A1* | 4/2006 | Winter et al. ................... | 438/777 |
| 2006/0247322 | A1* | 11/2006 | Li et al. ........................... | 516/33 |
| 2008/0161213 | A1* | 7/2008 | Jao et al. ........................ | 508/165 |
| 2009/0005277 | A1 | 1/2009 | Watts et al. | |
| 2009/0016652 | A1 | 1/2009 | Endo et al. | |
| 2009/0018037 | A1 | 1/2009 | Mabuchi et al. | |

OTHER PUBLICATIONS

J. Koo et al., "A new thermal conductivity model for nanofluids", Journal of Nanoparticle Research, 2004, 6:577-588.
L. Joly-Pottuz et al., "Anti-wear and Friction Reducing Mechanisms of Carbon Nano-onions as Lubricant Additives", Tribol Lett, 2008, 30:69-80.
Y. Ren et al., "Effective thermal conductivity of nanofluids containing spherical nanoparticles", J. Phys. D: Appl. Phys. 38, 2005, 3958-3961.
Y. Ding et al., "Forced convective heat transfer of nanofluids", Advanced Powder Technol., vol. 18, No. 6, pp. 813-824, 2007.
J. Vadasz et al., "Heat transfer enhancement in nano-fluids suspensions: Possible mechanisms and explanations", International Journal of Heat and Mass Transfer 48, 2005, 2673-2683.
S. Das et al., "Heat Transfer in Nanofluids—A Review", Heat Transfer Engineering, 27(10):3-19, 2006.
F. Marquis et al., "Improving the Heat Transfer of Nanofluids and Nanolubricants with Carbon Nanotubes", JOM, Dec. 2005, pp. 32-43.
M. Prakash et al., "Mechanism of heat transport in nanofluids", J Computer-Aided Mater Des, 2007, 14:109-117.
N. Leventis et al., "Nanoengineered Silica-Polymer Composite Aerogels with No Need for Supercritical Fluid Drying", Journal of Sol-Gel Science and Technology 35, 99-105, 2005.
J. Eijkel et al., "Nanofluidics: what is it and what can we expect from it?", Microfluid Nanofluid, 2005, 1:249-267.
W. Yu et al., "The role of interfacial layers in the enhanced thermal conductivity of nanofluids: A renovated Maxwell model", Journal of Nanoparticle Research 5: 167-171, 2003.
L. Joly-Pottuz et al., "The Role of Nickel in Ni-Containing Nanotubes and Onions as Lubricant Additives", Tribol Lett, 2008, 29: 213-219.
PCT International Search Report for PCT/US2010/022106 dated Aug. 23, 2010.

* cited by examiner

*Primary Examiner* — Quyen Leung
*Assistant Examiner* — Jose Gonzalez Quinones
(74) *Attorney, Agent, or Firm* — Bracewell & Giuliani LLP

(57) ABSTRACT

An electric submersible motor is provided that includes a plurality of rotors and bearings mounted on a shaft, and a stator external to said rotors. A running clearance is located between an inner diameter of the stator and external diameter of the rotors, and includes a lubricating oil that includes a base hydrocarbon oil and a plurality of nanoparticles. Also provided is an improved lubricant oil and method of preparation thereof are provided. The lubricant oil includes a hydrocarbon containing base oil and a plurality of nanoparticles. The nanoparticles may be present in an amount up to 30% by volume.

16 Claims, No Drawings

ADDITIVES FOR IMPROVING MOTOR OIL PROPERTIES

RELATED APPLICATIONS

This application claims priority to U.S. Provisional Patent Application Ser. No. 61/147,378, filed on Jan. 26, 2009, which is incorporated by reference in its entirety.

FIELD OF THE INVENTION

The invention relates to an oil composition, particularly a lubricating oil composition for use in a submersible electric motor.

BACKGROUND OF THE INVENTION

Oils are used for a variety of applications, including providing lubrication for engines and motors to extend lifetime and prevent failure. Oils that are used as lubricants provide lubrication between two moving surfaces, such as for example, bearings and other metal surfaces, to improve motor efficiency and improve motor run life. Additionally, lubricants are useful for carrying away heat that is generated within the motor, thereby reducing the operating temperature. Finally, oil may function as an electrical resistor between the stator and rotor in a motor.

Oils are generally selected based upon a desired viscosity at a specified operating temperature. Preferably, oils are selected to ensure efficient operation of a motor or engine at desired operating temperatures by providing sufficient viscosity to provide lubrication, while at the same time having sufficient lubrication to minimize friction. Additionally, oils preferably have good thermal conductivity to ensure they efficiently carry away heat generated by the operation of the motor. Finally, it is preferable that the oil have a high electrical resistance.

In certain oil recovery applications, such as for example, steam assisted gravity drainage (SAGD) or the production of heavy oil, increased pumping temperatures result in increased operating temperatures inside the motor. Generally, it is believed that the increase in temperature inside the motor is partially the result of the heat transfer characteristics of the oil. Thus, a temperature rise within the motor will typically be lower if the oil within the motor has a higher heat transfer capacity. It is believed that for every 10° C. increase in the operating temperature of a motor, the reliability and lifetime of the motor can be reduced by approximately 50%. Thus, there is a need for oils having increased heat transfer, lubricity and electrical resistance.

SUMMARY

Provided are motor oils having improved properties and methods of making same.

In one aspect, a submersible electric motor for down hole use well is provided. The motor includes a shaft, and a plurality of rotors and bearings mounted on said shaft. Each rotor includes a hollow cylinder comprising a stack of laminations, a copper bar and end rings. Each rotor is supported by at least one bearing. The motor also includes a stator positioned external to said rotors, such that a running clearance is formed between an internal diameter of the stator and an outside diameter of the rotor. The running clearance includes an oil that includes a base oil comprising a hydrocarbon and a plurality of nanoparticles suspended in said base oil.

In another aspect, a submersible electric motor for down hole use well is provided. The motor includes a shaft, at least one rotor and at least one bearing mounted on said shaft, a stator positioned external to the at least one rotor, and a running clearance located between an internal diameter of the stator and an outside diameter of the rotor; wherein the running clearance includes a lubricating oil. The lubricating oil includes a hydrocarbon containing base oil; and a plurality of nanoparticles suspended in base oil.

In another aspect, an electric submersible pump (ESP) assembly disposable within a wellbore is provided. The ESP assembly includes a motor comprising a plurality of rotors and bearings mounted on a shaft and a stator external to said plurality of rotors, a seal, and a pump, wherein the shaft is coupled to the pump and the motor through the seal, such that the shaft drives the pump. The motor includes a running clearance between an internal diameter of the stator and an external diameter of the rotor; and a lubricating oil within the running clearance, wherein the oil includes a hydrocarbon containing base oil and a plurality of nanoparticles. The seal also includes the same lubricating oil that is located within the motor.

In another aspect, a method of lubricating an electric submersible pump assembly disposable within a wellbore is provided. The assembly includes a motor, wherein the motor includes a plurality of rotors and bearings mounted on a shaft, a stator external to the plurality of rotors, and a running clearance between an internal diameter of the stator and an external diameter of the rotor. The motor is coupled to a pump via a seal section, and the motor shaft is coupled to a shaft in the seal section, which in turn is coupled to a shaft in the pump. The method includes the step of a plurality of nanoparticles into a lubricating oil, then dispensing the lubricating oil into motor and the seal section.

In another aspect, lubricating oil is provided. The oil includes a hydrocarbon containing base oil and a plurality of nanoparticles suspended in base oil.

In certain embodiments, the plurality of nanoparticles may be selected from the group consisting of carbon nanotubes; carbon nano-onions; graphite nanoparticles, nanotubes or nanofluids; diamond nanoparticles, their derivatives or nanofluids; silicon dioxide nanoparticles or organic functionalized derivatives thereof; aluminum oxide nanoparticles or organic functionalized derivatives thereof; metal oxide nanoparticles; metal sulfonates nanoparticles; tungsten disulfide nanoparticles or nanotubes; molybdenum disulfide nanoparticles or nanotubes; alumoxane nanoparticles or functionalized derivatives thereof; beryllium oxide nanoparticles and nanotubes; carbide nanoparticles; nitride nanoparticles; and combinations thereof.

In another aspect, a method for preparing lubricant oil having improved properties is provided. The method includes the steps of providing a hydrocarbon containing base oil; and suspending a plurality of nanoparticles in said base oil.

DETAILED DESCRIPTION OF THE INVENTION

Although the following detailed description contains many specific details for purposes of illustration, it is understood that one of ordinary skill in the art will appreciate that many examples, variations and alterations to the following details are within the scope and spirit of the invention. Accordingly, the exemplary embodiments of the invention described herein are set forth without any loss of generality to, and without imposing limitations thereon, the claimed invention.

In one aspect of the present invention, a lubricant composition having improved thermal, electrical and tribological properties is provided. Generally, the lubricant composition includes a base oil and at least one nanoparticle additive suspended therein. Suitable oils for the base oil are hydrocarbon based and may be natural oils or synthetic oils. As used herein, natural oil refers to a naturally occurring liquid consisting of a mixture of hydrocarbons having various molecular weights, which has been recovered from a subsurface rock formation, and may have been subjected to a refining process. As used herein, synthetic oil refers to a hydrocarbon liquid that consists of chemical compounds not originally present in crude oil, but were instead artificially synthesized from other compounds. As used herein, nanoparticles refers to particles or agglomerates having an average mean diameter of less than about 250 nm, preferably less than 200 nm, and more preferably between 5 and 150 nm.

Exemplary nanoparticle additives can include, but are not limited to, carbon nanotubes; carbon nano-onions; graphite nanoparticles, nanotubes or nanofluids; diamond nanoparticles or nanofluids; silicon dioxide nanoparticles or organic functionalized derivatives thereof; aluminum oxide nanoparticles or organic functionalized derivatives thereof; metal oxide nanoparticles (such as, for example, magnesium oxide, calcium oxide or copper oxide); metal sulfonates nanoparticles (such as, for example, magnesium sulfonate or calcium sulfonate); tungsten disulfide nanoparticles or nanotubes; molybdenum disulfide nanoparticles or nanotubes; alumoxane nanoparticles or functionalized derivatives thereof (such as, for example, carboxylate-alumoxane); beryllium oxide nanoparticles and nanotubes; carbide nanoparticles (such as, for example, silicon carbide, tungsten carbide or boron carbide); and nitrides (such as, for example, aluminum nitride); and combinations thereof. Preferably, the nanoparticle additive is at least slightly soluble in the lubricant composition. Exemplary shapes of the individual nanoparticles can include single or multi-walled nanotubes, spheres/balls, ribbons, and donut/wheel shapes. The particles can have a long dimension of up to about 250 nm in diameter or length, preferably up to about 200 nm in diameter or length.

A variety of functional groups can be appended to the nanoparticles or nanotubes. The functional group can include, but are not limited to, hydrocarbon derivatives. In certain embodiments, the functional group can be an alkyl, alkenyl, aromatic hydrocarbons, or mixtures or derivatives of those groups, or polymers of such. Preferable alkyl groups may include single molecules between one and fifty carbon atoms and may be a straight chain or branched, or polymeric species containing between about 10 and 20,000 carbon atoms. Optionally, the functional group may include at least one heretoatom selected from oxygen, sulfur and nitrogen. In certain preferred embodiments, the functional group may be hydrophobic.

In certain embodiments, the nanoparticle additive may be present in an amount up to about 30% by volume of the lubricant composition. Alternatively, the nanoparticle additive may be present in an amount up to about 20% by volume. In other embodiments, the nanoparticle additive may be present in an amount up to about 10% by volume. In certain embodiments, the nanoparticle additive may be present in an amount between 0.001 and 15% by volume, preferably between about 0.001 and 10% by volume. Alternatively, the nanoparticle additives may be present in an amount between about 0.001 and 5% by volume. In certain embodiments, the nanoparticle additives may be present in an amount of between about 0.1 ppm and about 5% by volume, alternatively in an amount between about 0.1 ppm and about 10% by volume, or alternatively between about 0.1 ppm and about 15% by volume. In certain embodiments, the nanoparticle additive is present in an amount of at least 0.1 ppm, alternatively at least about 1 ppm, alternatively at least about 10 ppm, or at least about 100 ppm.

In certain embodiments, at least two nanoparticle additives may be present in the lubricant composition, wherein the concentration of a first nanoparticle additives is between about 0.001 and 10% by volume, and the concentration of a second nanoparticle additive is between about 0.001 and 10% by volume. Alternatively, in embodiments that include at least two nanoparticle additives, the total concentration of the nanoparticle additives may be up to about 20% by volume, preferably between about 0.001 and 15% by volume. In certain embodiments, the at least two nanoparticle additives are present in an amount of at least about 0.1 ppm, alternatively at least about 1 ppm, alternatively at least about 10 ppm In certain embodiments, the lubricant composition may include more than two nanoparticle additives, wherein the total concentration of additives may be up to about 30% by volume, preferably up to about 20% by volume and even more preferably up to about 10% by volume. In other embodiments having more than two nanoparticle additives, the total concentration of additives may be between about 0.001 and 15% by volume.

The lubricant composition may optionally include additional chemical compounds, including but not limited to, anti-oxidants, detergents, friction modifiers, viscosity modifiers, corrosion inhibiting additives, anti-wear additives, anti-foam agents, surfactants, conditioners, and dispersants.

In another aspect, a method for producing hydrocarbon based lubricants having improved thermal, electrical and tribological properties are provided. The method generally includes the steps of providing a base oil and adding to the base oil a desired amount of nanoparticles operable to result in an improvement of at least one property selected from an increased lubricity, an increased heat transfer capacity, or an increased electrical resistance, or any other fluid property, such as for example, viscosity. For example, in certain experiments, thermal conductivity of the nanoparticles, nanotubes and nano-onions have been higher than the thermal conductivity of the base material from which they are manufactured. Without wishing to be bound by any specific theory, this increased thermal conductivity may be due to an increased surface area of the nanoparticles, nanotubes and nano-onions. The thermal conductivity is directly proportional to the heat transfer. In general, an increase in thermal conductivity results in an increase in the heat transfer through the matrix. Nanoparticle thermal properties have been proven to be enhanced when added to a matrix material, such as for example, an oil, or polymeric material. Previous studies have shown dramatic increases in thermal conductivity when nanoparticles have been added to water or other solutions. Similarly, other physical properties, such as for example, the lubricity and electrical resistance of the base oil, can be increased by addition of certain nanoparticles, nanotubes and nano-onions. The computational modeling shows that improving thermal conductivity of the oil by 20-50% may decrease the motor internal temperature by up to about 10-20° C. In certain embodiments, to achieve a proper balance of desired properties of the base oil, a combination of different amounts of nanoparticles, nanotubes and nano-onions can be added to the base oil. In certain embodiments, the method may include adding additives in a concentration of up to about 30% by volume, preferably up to about 20% by volume, and more preferably up to about 10% by volume.

In one exemplary embodiment, wherein the bottom hole temperature of a well being produced is greater than about 200° F., a submersible electric motor having a plurality of rotors and bearings mounted on a shaft and a long stator is provided. The rotor can be a hollow cylinder made of a stack of laminations, a copper bar and end rings, which is supported at each end by the bearings. A running clearance located between the internal diameter of the stator and outside diameter of the rotor includes oil, which provides lubrication for the bearings and carries away heat generated by friction and rotor and windage losses and acts as an electrical resistor between the stator and the rotor. The oil based lubricant employed in the submersible motor includes up to about 30% by volume of nanoparticles. Alternatively, the oil based lubricant may include up to about 20% by volume of nanoparticles. In other embodiments, the oil based lubricant may include up to about 10% by volume of nanoparticles. The nanoparticles may include, but are not limited to, carbon nanotubes; carbon nano-onions; graphite nanoparticles, nanotubes or nanofluids; diamond nanoparticles or their derivatives; diamond nanofluids; silicon dioxide nanoparticles or organic functionalized derivatives thereof; aluminum oxide nanoparticles or organic functionalized derivatives thereof; metal oxide nanoparticles (such as, for example, magnesium oxide, calcium oxide or copper oxide); metal sulfonates nanoparticles (such as, for example, magnesium sulfonate or calcium sulfonate); molybdenum disulfide nanoparticles or nanotubes; tungsten disulfide nanoparticles or nanotubes; alumoxane nanoparticles or functionalized derivatives thereof (such as, for example, carboxylate-alumoxane); beryllium oxide nanoparticles and nanotubes; carbide nanoparticles (such as, for example, silicon carbide, tungsten carbide or boron carbide); and nitrides (such as, for example, aluminum nitride); and combinations thereof. In certain embodiments, the functionalized derivative is an organic moiety.

In an alternate embodiment, an electrical submersible pumping system (ESP) is disposed in a wellbore, wherein the wellbore may intersect a subterranean formation. The ESP includes on a lower end a motor, a seal, and a pump on an upper end. The motor and pump are separated by the seal. The motor includes a plurality of rotors and bearings mounted on a motor shaft, wherein said shaft is coupled to and drives the pump. The motor shaft is coupled to the pump via a seal section, and the motor shaft is coupled to a shaft in the seal section, which in turn is coupled to a shaft in the pump. The rotor can be a hollow cylinder made of a stack of laminations, a copper bar and end rings, which is supported at each end by the bearings. The motor is filled with a lubricating oil and includes a running clearance located between the internal diameter of the stator and outside diameter of the rotor wherein the oil provides lubrication for the bearings and carries away heat generated by friction and rotor and windage losses and acts as an electrical resistor between the stator and the rotor. The oil within the running clearance can be circulated within the motor through a hole in the shaft. The oil in the motor is also used in the seal, and communicates and circulates between the seal and motor. The oil used in the seal assists with the cooling of the thrust bearing in the seal. The oil within the motor and seal can include up to about 30% by volume of nanoparticles. Alternatively, the oil based lubricant may include up to about 20% by volume of nanoparticles. In other embodiments, the oil based lubricant may include up to about 10% by volume of nanoparticles. The nanoparticles may include, but are not limited to, carbon nanotubes; carbon nano-onions; graphite nanoparticles, nanotubes or nano fluids; diamond nanoparticles or their derivatives; diamond nanofluids; silicon dioxide nanoparticles or organic functionalized derivatives thereof; aluminum oxide nanoparticles or organic functionalized derivatives thereof; metal oxide nanoparticles (such as, for example, magnesium oxide, calcium oxide or copper oxide); metal sulfonates nanoparticles (such as, for example, magnesium sulfonate or calcium sulfonate); molybdenum disulfide nanoparticles or nanotubes; tungsten disulfide nanoparticles or nanotubes; alumoxane nanoparticles or functionalized derivatives thereof (such as, for example, carboxylate-alumoxane); beryllium oxide nanoparticles and nanotubes; carbide nanoparticles (such as, for example, silicon carbide, tungsten carbide or boron carbide); and nitrides (such as, for example, aluminum nitride); and combinations thereof. In certain embodiments, the functionalized derivative is an organic moiety.

In an alternate embodiment of the invention, a method of lubricating an electric submersible pump assembly disposable within a wellbore is provided. The assembly includes a motor, wherein the motor includes a plurality of rotors and bearings mounted on a shaft, a stator external to the plurality of rotors, and a running clearance between an internal diameter of the stator and an external diameter of the rotor. The motor is coupled to a pump via a seal section, and the motor shaft is coupled to a shaft in the seal section, which in turn is coupled to a shaft in the pump. The method includes the step of a plurality of nanoparticles, such as those described herein, into a lubricating oil, then dispensing the lubricating oil into motor and the seal section. The nanoparticles can be present in the lubricating oil in an amount up to about 10% by volume, alternately up to about 20% by volume, or up to about 30% by volume. In certain preferred embodiments, the nanoparticles are present in the lubricating oil, which may be a petroleum based oil or a synthetic oil, in an amount between about 0.1 and 10% by volume.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

That which is claimed is:

1. A submersible electric motor for down hole use well, the motor comprising:
   a shaft;
   a plurality of rotors and bearings mounted on said shaft, each rotor comprising a hollow cylinder comprising a stack of laminations, a copper bar and end rings, and wherein each rotor is supported by at least one bearing;
   a stator positioned external to said rotors;
   a running clearance located between an internal diameter of the stator and an outside diameter of the rotor; and wherein the motor is filled with an oil;
wherein the oil comprises a base oil comprising a hydrocarbon and a plurality of nanoparticles suspended in said base oil, wherein the nanoparticles include a functional group appended thereto, wherein the functional group is selected from alkyl, alkenyl, aromatic hydrocarbons, or mixtures or derivatives of these groups, or polymers of such; and
wherein the oil comprises up to about 30% by volume nanoparticles.

2. The submersible electric motor of claim 1, wherein the oil comprises between about 0.001 and 5% by volume nanoparticles.

3. The submersible electric motor of claim 1, wherein the oil is a synthetic oil.

4. The submersible electric motor of claim 1, wherein the nanoparticles are selected from the group consisting of carbon nanotubes; carbon nano-onions; graphite nanoparticles, nanotubes or nanofluids; diamond nanoparticles or derivatives thereof; nanofluids; silicon dioxide nanoparticles or organic functionalized derivatives thereof; aluminum oxide nanoparticles or organic functionalized derivatives thereof; metal oxide nanoparticles; metal sulfonates nanoparticles; molybdenum disulfide nanoparticles or nanotubes; tungsten disulfide nanoparticles or nanotubes; alumoxane nanoparticles or functionalized derivatives thereof; beryllium oxide nanoparticles and nanotubes; carbide nanoparticles; nitride nanoparticles; and combinations thereof.

5. The submersible electric motor of claim 1, wherein the functional group includes at least one heteroatom selected from oxygen, sulfur and nitrogen.

6. A submersible electric motor for down hole use well, the motor comprising:
a shaft;
at least one rotor and at least one bearing mounted on said shaft;
a stator positioned external to the at least one rotor;
a running clearance located between an internal diameter of the stator and an outside diameter of the rotor; and
a lubricating oil disposed within the running clearance and other cavities of the motor;
wherein the oil comprises a hydrocarbon containing base oil and a plurality of nanoparticles suspended in said base oil;
wherein said plurality of nanoparticles have an average particle diameter of less than about 200 nm;
wherein the nanoparticles include a functional group appended thereto, wherein the functional group is selected from alkyl, alkenyl, aromatic hydrocarbons, or mixtures or derivatives of these groups, or polymers of such; and
wherein the nanoparticles are present in a concentration of up to about 25% by volume.

7. The submersible electric motor of claim 6, wherein the plurality of nanoparticles are selected from the group consisting of carbon nanotubes; carbon nano-onions; graphite nanoparticles, nanotubes or nanofluids; diamond nanoparticles or derivatives thereof; nanofluids; silicon dioxide nanoparticles or organic functionalized derivatives thereof; aluminum oxide nanoparticles or organic functionalized derivatives thereof; metal oxide nanoparticles; metal sulfonates nanoparticles; molybdenum disulfide nanoparticles or nanotubes; tungsten disulfide nanoparticles or nanotubes; alumoxane nanoparticles or functionalized derivatives thereof; beryllium oxide nanoparticles and nanotubes; carbide nanoparticles; nitride nanoparticles; and combinations thereof.

8. The submersible electric motor of claim 6, wherein the nanoparticles are present in a concentration of between about 0.001 and 15% by volume.

9. The submersible electric motor of claim 6, wherein the nanoparticle is hydrophobic.

10. The submersible electric motor of claim 6, wherein the nanoparticle additive is partially soluble in the base oil.

11. The submersible electric motor of claim 6, wherein the base oil is a synthetic oil.

12. The submersible electric motor of claim 6, wherein the functional group includes at least one heteroatom selected from oxygen, sulfur and nitrogen.

13. A method of lubricating an electric submersible pump assembly disposable within a wellbore, the assembly comprising a motor, the motor comprising a plurality of rotors and bearings mounted on a shaft, a stator external to said plurality of rotors, and a running clearance between an internal diameter of the stator and an external diameter of the rotor, the motor being coupled to a pump via a seal section, the motor shaft being coupled to a shaft in the seal section, which in turn is coupled to a shaft in the pump, the method comprising;
dispensing a plurality of nanoparticles into a lubricating oil, then dispensing the lubricating oil into motor and the seal section, wherein said nanoparticles include a functional group appended thereto, wherein the functional group is selected from alkyl, alkenyl, aromatic hydrocarbons, or mixtures or derivatives of these groups, or polymers of such; and wherein said lubricating oil comprises between about 0.001 and 15% by volume.

14. The method of claim 13 wherein the base lubricating oil is a synthetic oil.

15. The method of claim 13 wherein the plurality of nanoparticles is selected from the group consisting of carbon nanotubes; carbon nano-onions; graphite nanoparticles, nanotubes or nanofluids; diamond nanoparticles or derivatives thereof; nanofluids; silicon dioxide nanoparticles or organic functionalized derivatives thereof; aluminum oxide nanoparticles or organic functionalized derivatives thereof; metal oxide nanoparticles; metal sulfonates nanoparticles; molybdenum disulfide nanoparticles or nanotubes; tungsten disulfide nanoparticles or nanotubes; alumoxane nanoparticles or functionalized derivatives thereof; beryllium oxide nanoparticles and nanotubes; carbide nanoparticles; nitride nanoparticles; and combinations thereof.

16. The method of claim 13, wherein the functional group includes at least one heteroatom selected from oxygen, sulfur and nitrogen.

* * * * *

UNITED STATES PATENT AND TRADEMARK OFFICE
CERTIFICATE OF CORRECTION

| | | |
|---|---|---|
| PATENT NO. | : 8,076,809 B2 | Page 1 of 1 |
| APPLICATION NO. | : 12/693569 | |
| DATED | : December 13, 2011 | |
| INVENTOR(S) | : Kevin S. Tingler | |

It is certified that error appears in the above-identified patent and that said Letters Patent is hereby corrected as shown below:

Column 2, line 2, delete "use well" and insert --well use--

Signed and Sealed this
Twenty-seventh Day of March, 2012

David J. Kappos
*Director of the United States Patent and Trademark Office*